(12) United States Patent
Sparrold et al.

(10) Patent No.: US 6,343,767 B1
(45) Date of Patent: Feb. 5, 2002

(54) MISSILE SEEKER HAVING A BEAM STEERING OPTICAL ARRANGEMENT USING RISLEY PRISMS

(75) Inventors: Scott W. Sparrold; James P. Mills; Richard A. Paiva, all of Tucson; Thomas D. Arndt, Amado; David J. Knapp; Kenneth S. Ellis, both of Tucson, all of AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/261,724

(22) Filed: Mar. 3, 1999

(51) Int. Cl.$^7$ ................................................ F41G 7/00
(52) U.S. Cl. ...................................... 244/3.16; 244/3.15
(58) Field of Search ................................ 244/3.1, 3.11, 244/3.13, 3.15, 3.16, 3.17; 250/203.1, 203.3, 338.1, 340, 342; 359/196, 197, 209, 211, 399, 401, 402, 403, 404

(56) References Cited

U.S. PATENT DOCUMENTS

| | | |
|---|---|---|
| 1,735,108 A | 11/1929 | Cox |
| 3,253,525 A | 5/1966 | Merkel |
| 3,507,565 A | 4/1970 | Alvarez et al. |
| 3,974,383 A * | 8/1976 | Chapman .................... 250/342 |
| 4,252,401 A * | 2/1981 | Jozwiak ...................... 359/211 |
| 4,787,725 A * | 11/1988 | Preussner et al. ........... 359/401 |
| 5,512,741 A * | 4/1996 | Levaillant et al. ......... 250/203.3 |

* cited by examiner

*Primary Examiner*—Bernarr E. Gregory
(74) *Attorney, Agent, or Firm*—David W. Collins; Colin M. Raufer; Glenn L. Lenzen, Jr.

(57) ABSTRACT

A missile seeker. The inventive missile seeker includes a dome within which a novel optical arrangement is retained. The optical arrangement includes a first prism mounted for rotation about an optical axis and a second prism mounted for rotation about the optical axis. In the illustrative embodiment, the first and second prisms are Risley prisms. In addition, the illustrative implementation includes a first motor arrangement for rotating the first prism about the optical axis and a second motor arrangement for rotating the second prism about the optical axis. A controller is provided for activating the first and second motors to steer the beam at an angle φ and nod the beam at an angle θ. In a specific implementation, the first prism and/or the second prism have at least two surfaces contoured to correct for optical aberration. A teaching is provided to contour the surfaces to correct for astigmatism, coma, trefoil and other non-rotationally symettric abberation. The contour may be effected by laser etching, micro-machining optical thin-film coating or other such technique.

18 Claims, 6 Drawing Sheets

Risley

Risley's with Zernike surfaces

Top View surface description $T(r,\theta)$

Wedge angle = A = tan⁻¹ a

MISSILE SEEKER HAVING A BEAM STEERING OPTICAL ARRANGEMENT USING RISLEY PRISMS

BACKGROUND OF THE INVENTION

1. Field of the Invention

The present invention relates to missile systems. More specifically, the present invention relates to optically guided missile systems.

2. Description of the Related Art

For certain applications, optical systems are preferred for missile guidance. Current optically-guided missiles are often constrained by the need to balance aerodynamic considerations and optical considerations with respect to the missile dome. That is, from an optical perspective, a flat dome is preferred. However, from an aerodynamic perspective, an elongate aerodynamically shaped dome is preferred to reduce drag. Hence, using conventional teachings, an optically-guided missile can not be optimized with respect to either aerodynamic or optical considerations and consequently the designer is forced to accept certain performance compromises to meet design objectives.

Accordingly, there is a need in the art for a missile having a conformal dome. That is, there is a need in the art for a missile having an optical guidance system which allows for the dome to be 'conformed' for aerodynamic considerations.

SUMMARY OF THE INVENTION

The need in the art is addressed by the missile of the present invention. The inventive missile includes a dome within which a novel optical arrangement is retained. The optical arrangement includes a first prism mounted for rotation about an optical axis and a second prism mounted for rotation about the optical axis.

In the illustrative embodiment, the first and second prisms are Risley prisms. In addition, the illustrative implementation includes a first motor arrangement for rotating the first prism about the optical axis and a second motor arrangement for rotating the second prism about the optical axis. A controller is provided for activating the first and second motors to steer the beam at an angle +and nod the beam at an angle θ.

In a specific implementation, the first prism and/or the second prism have at least one surface contoured to correct for optical aberration. A teaching is provided to contour the surface to correct for astigmatism, coma, trefoil, oblique and/or focus. The contour is effected by laser etching, micro-machining, optical thin-film coating or other such technique known in the art.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
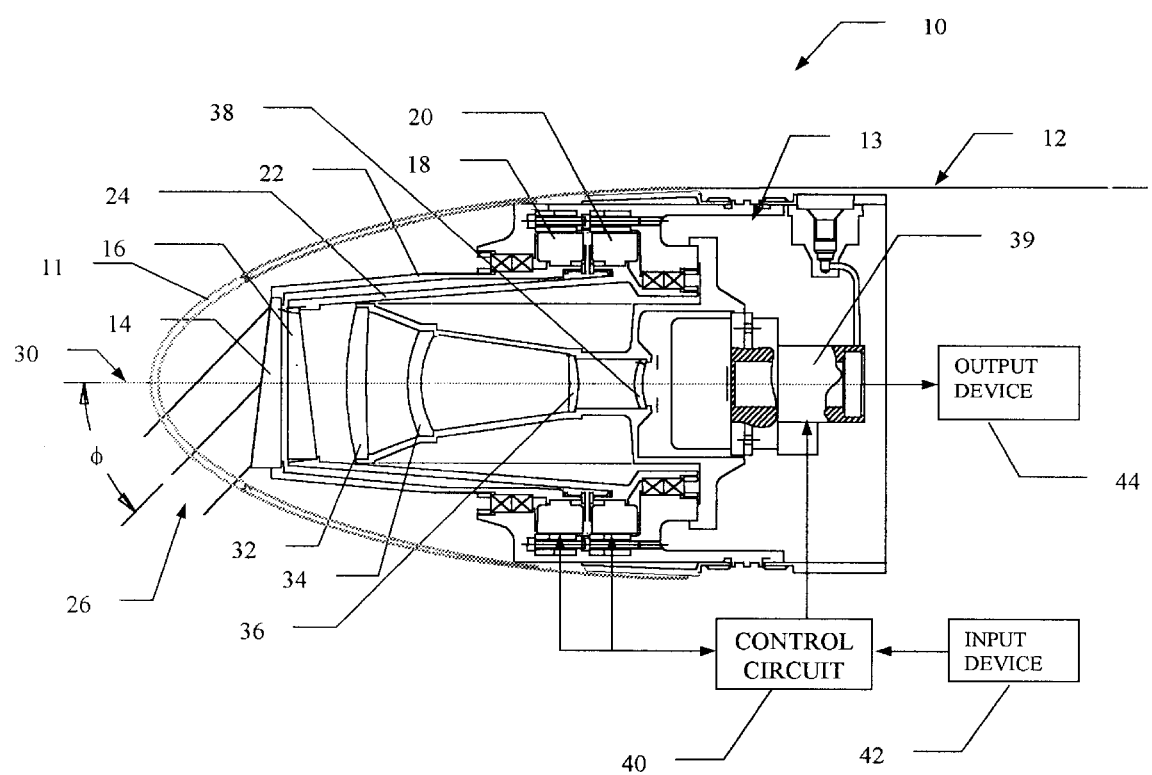
FIG. 1 is a sectional side view of a missile constructed in accordance with the teachings of the present invention.

FIG. 1 is a sectional side view of a missile seeker constructed in accordance with the teachings of the present invention. The seeker 10 has a dome 11 which is secured to a missile body 12. As is common in the art, the frame 13 is disposed within the missile body 12 along with a guidance and propulsion system and a warhead or payload, none of which are shown. In addition, a set of control surfaces (not shown) are also typically attached to the missile body 12 as is common in the art. Within the frame 13, a set of wedge-shaped prisms 14 and 16 are disposed. Those skilled in the art will appreciate that the prisms are Risley prisms. The prisms 14 and 16 are independently rotated by first and second motors 18 and 20 respectively. First and second conic-shaped cylinders 22 and 24 connect the first and second prisms 14 and 16 to the first and second motors 18 and 20, respectively.

As discussed more fully below, the rotation of the prisms is effective to steer a seeker line of sight (LOS) 26 and thereby change the pointing or roll angle θ (not shown in FIG. 1) and the nod angle ϕ measured with respect to an optical axis 30. The roll angle θ and the nod angle ϕ are set by the user via an input device 42 and a control circuit 40. The input device 42 may be a microprocessor, ASIC, or other suitable device. The control circuit 40 drives the motors 18 and 20 to rotate the first and second prisms 14 and 16 to steer the beam 26 to the desired roll and nod angles. The LOS is directed by the prisms 14 and 16 to a spherical lens 32. The spherical lens 32 is part of an objective doublet along with an aspherical lens 34. The spherical lens 32 and the aspherical lens 34 are of conventional design and construction.

The aspherical lens 34 directs the LOS 26 along the optical path to an eyepiece consisting of first and second lenses 36 and 38. The eyepiece subsequently directs the field of view to an integrated detector assembly 39 and ultimately to an output device 44.

Figure 2:
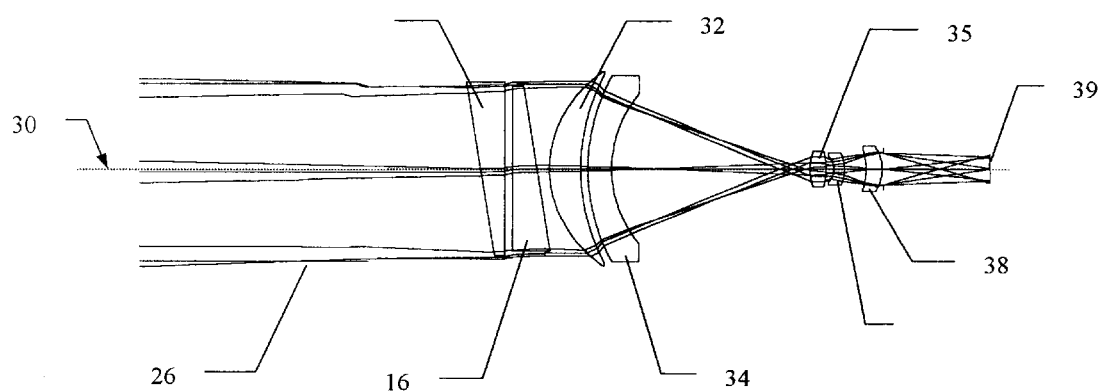
FIG. 2 is a simplified diagram of the optical arrangement utilized in the missile shown in FIG. 1 with the front and back prisms being rotated to steer the beam at a nod angle of zero degrees.

FIG. 2 is a simplified diagram of the optical arrangement utilized in the missile shown in FIG. 1 with the front and back prisms being rotated to steer the LOS 26 at a nod angle of zero degrees.

Figure 3:
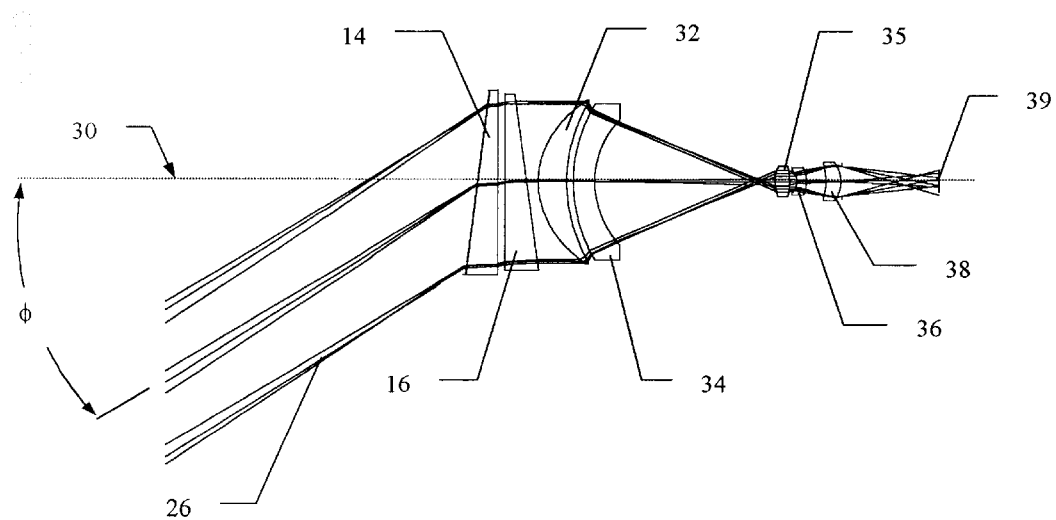
FIG. 3 is a simplified diagram of the optical arrangement utilized in the missile shown in FIG. 1 with the front and back prisms being rotated to steer the beam at a nod angle of ϕ degrees.

FIG. 3 is a simplified diagram of the optical arrangement utilized in the missile shown in FIG. 1 with the front and back prisms being rotated to steer the LOS 26 at a nod angle of θ degrees. As illustrated in FIGS. 2 and 3, and in accordance with the present teachings, the line-of-sight of the optical system is stabilized and steered by counter-rotating the wedges 14 and 16. The roll and nod angles α and θ are related to relative angles of the wedges as follows.

Figure 4:
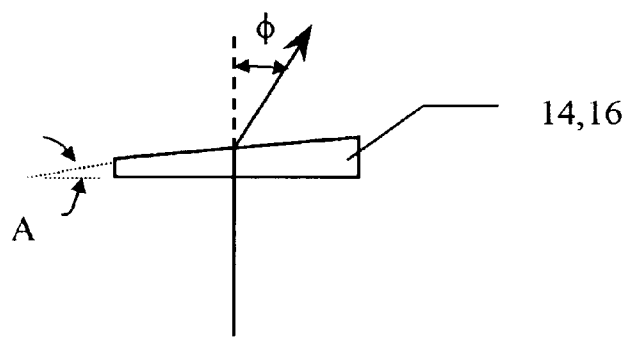
FIG. 4 is a side view of a single wedge utilized in the optical arrangement of the missile of the present invention.

FIG. 4 is a side view of a single wedge 14 or 16. The following equations relate the wedge angle A, the deviation angle D and index of refraction 'n' as follows. Equation [1] relates deviation angle D and index of refraction (n) to wedge angle A for a single wedge for the case where the angle of incidence at the first surface is zero as illustrated in FIG. 4:

$$A = \arcsin(\sin(\phi)/(n-1)) \quad [1]$$

$$\sin A = (\sin(\phi)/(n-1)) \quad [2]$$

and $$(n-1)\sin A = \sin(\phi) \quad [3]$$

therefore $$\phi = \arcsin((n-1)\sin A) \quad [4]$$

where D is the deviation angle, A is the wedge angle, and n is the index of refraction. Thus, a wedge made of germanium having an index of refraction of 4 and a wedge angle of 6.5° yields a deviation angle D of 20° and a high dispersion (Abbe Number of 100). Likewise, a wedge made of silicon having an index of refraction of 3.4 and a wedge angle of 8.2° yields a deviation angle D of 20° and a low dispersion (Abbe Number of 225).

Figure 5:
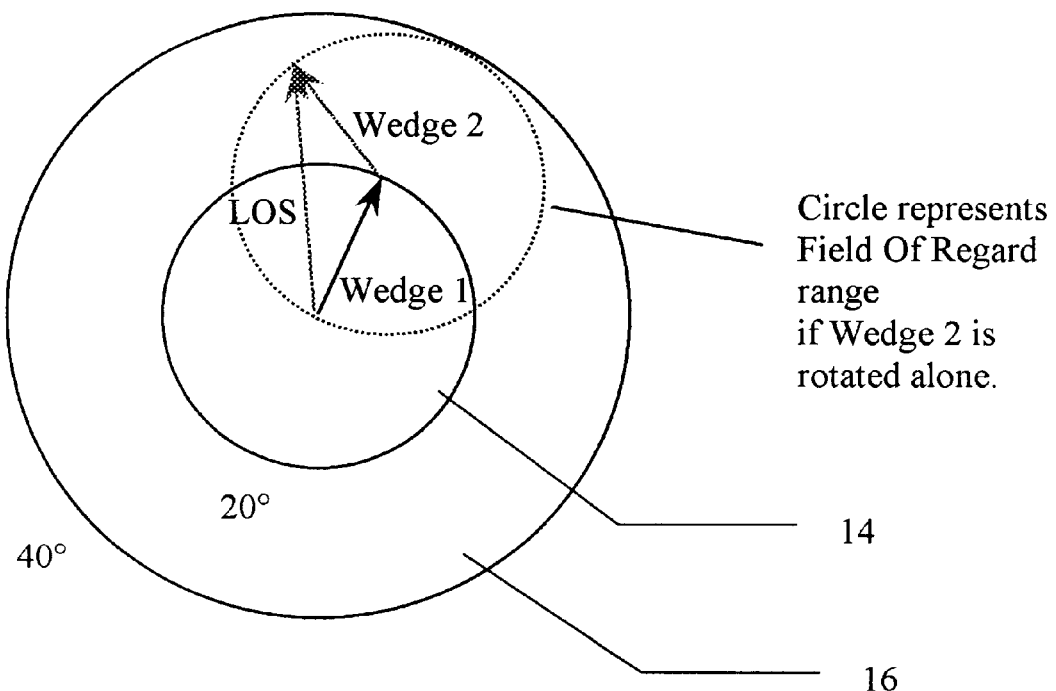
FIG. 5 is a diagram using vector notation to describe the line-of-sight of the optical arrangement utilized in the missile of the present invention.

FIG. 5 is a diagram using vector notation to describe the line-of-sight of the optical arrangement utilized in the missile of the present invention. As illustrated in FIGS. 4 and 5, to achieve a nod motion, the wedges are counter-rotated equal and opposite directions. With two wedges 14 and 16, the deviation angle of each wedge $D_1$ and $D_2$ are related to the nod angle φ by equation [5] below:

$$\phi = 2\sin\theta^{-1}((n-1)\sin A) \quad [5]$$

where θ is the rational angle of each wedge (in opposite direction).

The relationship between the wedge angles, indices of refraction, wedge roll angles and the nod and roll angles φ and α are disclosed in U.S. Pat. No. 1,735,108 issued Nov. 10, 1929 to H. N. Cox entitled OPTICAL ADJUSTING DEVICE; U.S. Pat. No. 3,253,525 issued May 31, 1966 to F. J. Merkel entitled VARIABLE OPTICAL WEDGE; U.S. Pat. No. 3,507,565 issued Apr. 21, 1970 to L. W. Alvarez et al. ENTITLED VARIABLE-POWER LENS AND SYSTEM; U.S. Pat. No. 3,378,326 to Alvarez and U.S. Pat. No 3,884,548 to issued May 20, 1975 to S. L. Linder entitled VARIABLE OPTICAL WEDGE FOR IMAGE STABLILIZATION AND OTHER PURPOSES the teachings of which are incorporated herein by reference.

Figure 6:
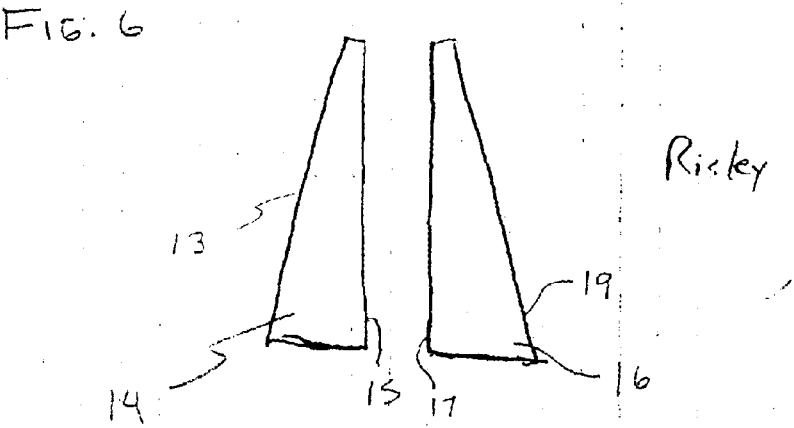
FIG. 6 is a diagram showing side views of the first and second prisms of the optical arrangement utilized in the missile of the present invention.

FIG. 6 is a diagram showing side views of the first and second prisms of the optical arrangement utilized in the missile of the present invention.

Figure 7:
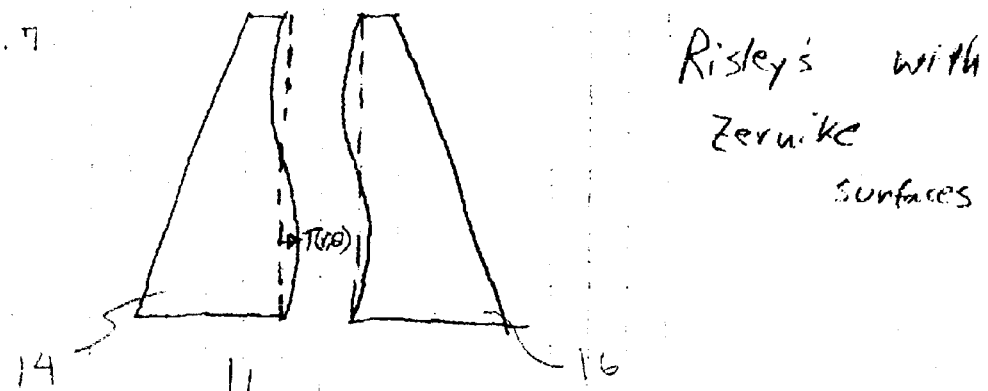
FIG. 7 is a diagram showing side views of the first and second prisms of FIG. 1 with surface contours in accordance with the present teachings.
Figure 8:
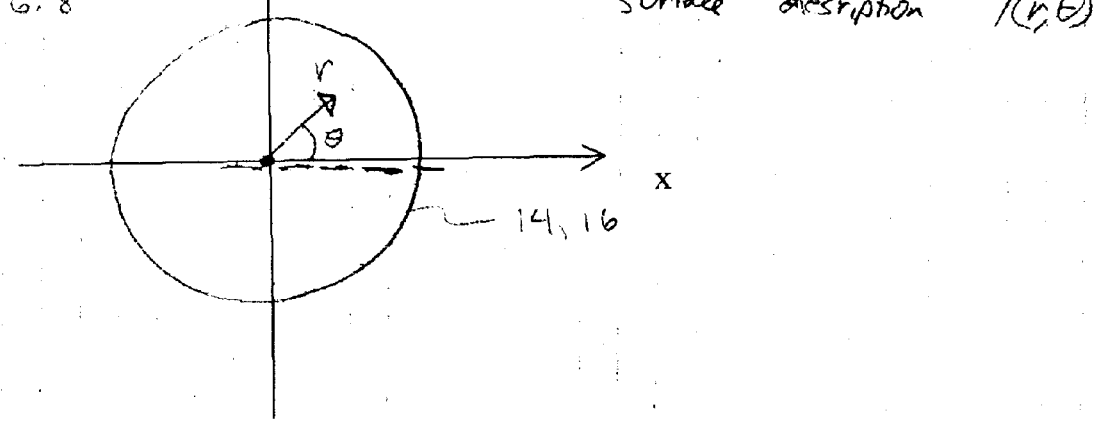
FIGS. 8, 9, 10a and 10b are diagrams which illustrate conventions used to facilitate an understanding of the teachings provided herein.
Figure 9:
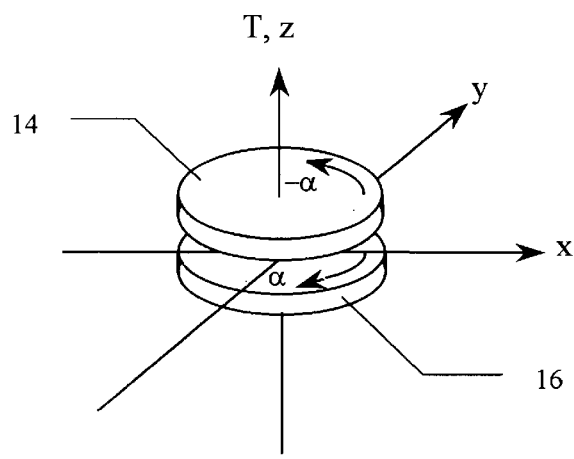
Figure 10A:
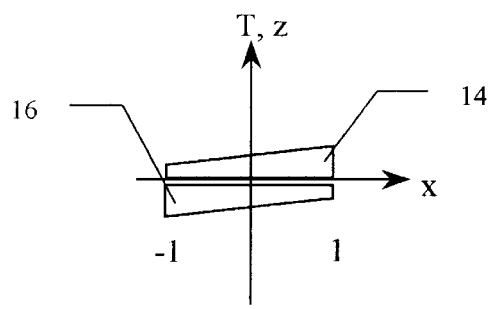
Figure 10B:
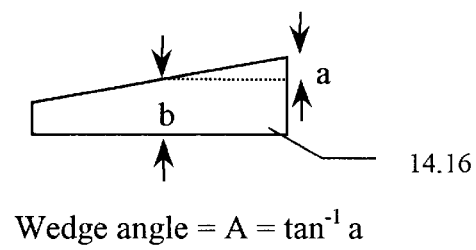

FIG. 7 is a diagram showing side views of the first and second prisms of FIG. 1 with surface contours in accordance with the present teachings. As illustrated in FIGS. 6 and 7, each prism has a wedge or trapezoidal geometry from a side view. The first prism 14 has a first surface 13 and a second surface 15. The second prism 16 has a first surface 17 and a second surface 19. The second surface 15 of the first prism faces the first surface 17 of the second prism 16. In accordance with the present teachings, the second surface 15 of the first prism and the first surface 17 of the second prism 16 (hereinafter the 'correction surfaces') are contoured to correct for optical aberrations such as astigmatism, coma, trefoil, oblique and focus. Those skilled in the art will appreciate that the correction surfaces may be etched in accordance with the surface descriptions provided below using photolithography, laser etching, micro-machining, optical thin-films or other any suitable technique known in the art.

FIGS. 8, 9, 10a and 10b are diagrams which illustrate conventions used to facilitate an understanding of the teachings provided herein. Table I below is a surface deformation table with provides surface descriptions which may be used to correct for the optical aberrations mentioned above along with tilt or nod.

TABLE I

| Wavefront Deformation | Surface Description | Resulting OPD(R,θ,α) after both prisms counter-rotate by α | Fringe Zernike |
|---|---|---|---|
| Tilt in y | ar cos θ | $-2a(n-1)\sin\alpha\, r \sin\theta$ | 3 |
| Astigmatism | $b - (r^2)\cos 2\theta$ | $-2b(n-1)\sin 2\alpha\, r^2 \sin 2\theta$ | 6 |
| Coma | $c(3r^3 - 2r)\cos\theta$ | $-c2(n-1)\sin\alpha\, (3r^3 - 2r)\sin\theta$ | 8 |
| Trefoil | $d(r^3)\sin 3\theta$ | $-2c(n-1)\sin 3\alpha\, r^3 \cos 3\theta$ | 10 |

The Zernike terms Z4, Z5, Z7 and Z11 can be generated along with Z3, Z6, Z8 and Z10, respectively, by rotating both plates together.

Figure 11:
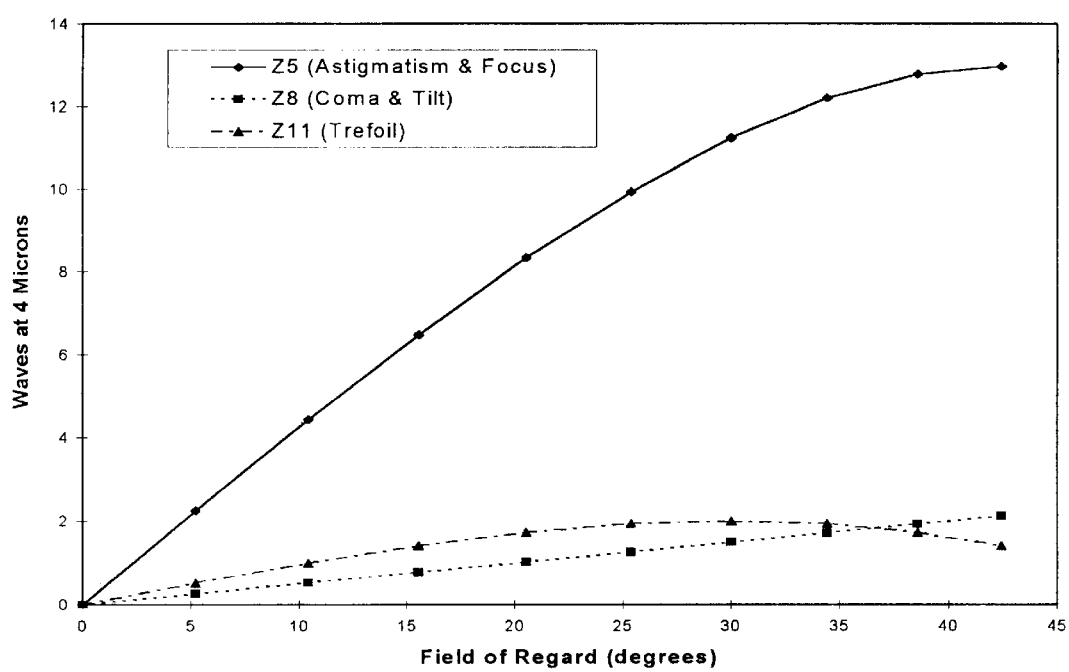
FIG. 11 is a graph which illustrates that aberrations can be generated with counter-rotating phase plates.

FIG. 11 is a graph which illustrates that aberrations can be generated with counter-rotating phase plates.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A missile seeker including:
   an aerodynamically-conformed dome secured to a missile; and
   a steerable optical arrangement disposed within said dome, the optical arrangement comprising:
   a first prism mounted for rotation about an optical axis and
   a second prism mounted for rotation about said optical axis,
   said first prism having at least one surface and said second prism having at least one surface, and at least one of said surfaces being contoured to correct for optical aberration attributable at least in part to said dome.

2. The invention of claim 1 including first means for rotating said first prism about said optical axis.

3. The invention of claim 2 further including second means for rotating said second prism about said optical axis.

4. The invention of claim 3 further including means for controlling said first means and said second means to steer a beam at a roll angle φ.

5. The invention of claim 4 further including means for controlling said first means and said second means to nod said beam at an angle θ.

6. The invention of claim 1 wherein said first prism is a Risley prism.

7. The invention of claim 6 wherein said second prism is a Risley prism.

8. The invention of claim 1 wherein said first prism and said second prism have at least one surface contoured to correct for optical aberration.

9. The invention of claim 8 wherein said optical aberration is astigmatism.

10. The invention of claim 8 wherein said optical aberration is coma.

11. The invention of claim 8 wherein said optical aberration is trefoil.

12. The invention of claim 8 wherein said optical aberration is any non-rotationally symmetric aberration.

13. The invention of claim 8 wherein said optical aberration is focus.

14. The invention of claim 13 wherein said optical aberration is astigmatism.

15. The invention of claim 14 wherein said optical aberration is coma.

16. The invention of claim 15 wherein said optical aberration is trefoil.

17. The invention of claim 1 including means for controlling the rotation of said first prism relative to said second prism.

18. The invention of claim 17 wherein said means for controlling includes means for rotating said first prism.

* * * * *